United States Patent [19]

Okanoue et al.

[11] Patent Number: 6,007,238

[45] Date of Patent: Dec. 28, 1999

[54] COMMUNICATION METHOD AND COMMUNICATION SYSTEM USING THE SAME

[75] Inventors: Kazuhiro Okanoue; Akihisa Ushirokawa, both of Tokyo, Japan

[73] Assignee: NEC Corporation, Japan

[21] Appl. No.: 08/507,804

[22] Filed: Jul. 26, 1995

[30] Foreign Application Priority Data

Jul. 27, 1994 [JP] Japan .................................. 6-175328

[51] Int. Cl.[6] .................................................. H03M 13/00
[52] U.S. Cl. .......................................... 371/41; 371/37.01
[58] Field of Search .................................. 371/37.1, 37.7, 371/30, 41, 39.1, 43, 1, 20.1, 37.01, 37.5, 43.1; 370/94.1, 17, 79

[56] References Cited

U.S. PATENT DOCUMENTS

| | | | |
|---|---|---|---|
| 4,199,780 | 4/1980 | Taylor | 358/8 |
| 4,435,781 | 3/1984 | Stattel et al. | 364/900 |
| 4,701,923 | 10/1987 | Fukasawa et al. | 371/41 |
| 4,970,714 | 11/1990 | Chen et al. | 370/17 |
| 4,979,173 | 12/1990 | Geldman et al. | 371/39.1 |
| 4,979,174 | 12/1990 | Cheng et al. | 371/41 |
| 5,068,854 | 11/1991 | Chandran et al. | 371/37.1 |
| 5,070,503 | 12/1991 | Shikakura | 371/37.1 |
| 5,097,469 | 3/1992 | Douglas | 371/20.1 |
| 5,210,751 | 5/1993 | Onoe et al. | 370/94.1 |
| 5,260,951 | 11/1993 | Watanabe | 371/41 |
| 5,280,533 | 1/1994 | Blaum et al. | 371/1 |
| 5,357,249 | 10/1994 | Azaren et al. | 341/100 |
| 5,430,738 | 7/1995 | Tsuda | 371/37.1 |
| 5,430,743 | 7/1995 | Marturano et al. | 371/43 |
| 5,440,555 | 8/1995 | Momona | 370/79 |
| 5,537,421 | 7/1996 | Dujari et al. | 371/37.1 |

OTHER PUBLICATIONS

Vijay K. Bhargava, et al., "Digital Communications by Satellite", Willey & Sons, Inc. 1983.

*Primary Examiner*—Reba I. Elmore
*Assistant Examiner*—Robert J. Dolan
*Attorney, Agent, or Firm*—Ostrolenk, Faber, Gerb & Soffen, L

[57] ABSTRACT

A transmission side generates a first frame comprising a field for storing error correction coded information and a field for storing identification information representing error correction coded information, and generates a second frame comprising a field for storing non error correction coded information, a field for storing identification information representing non error correction coded information and a field for storing an error-detecting bit. A reception side detects whether or not a received frame has an error based on bit contents of the field storing the error-detecting bit of the received frame. If the received frame has an error, a frame type is detected based on the identification information. If the detected frame type is the first type the received frame is output to a process stage. If the detected frame type is the second type the received frame is abandoned.

18 Claims, 11 Drawing Sheets

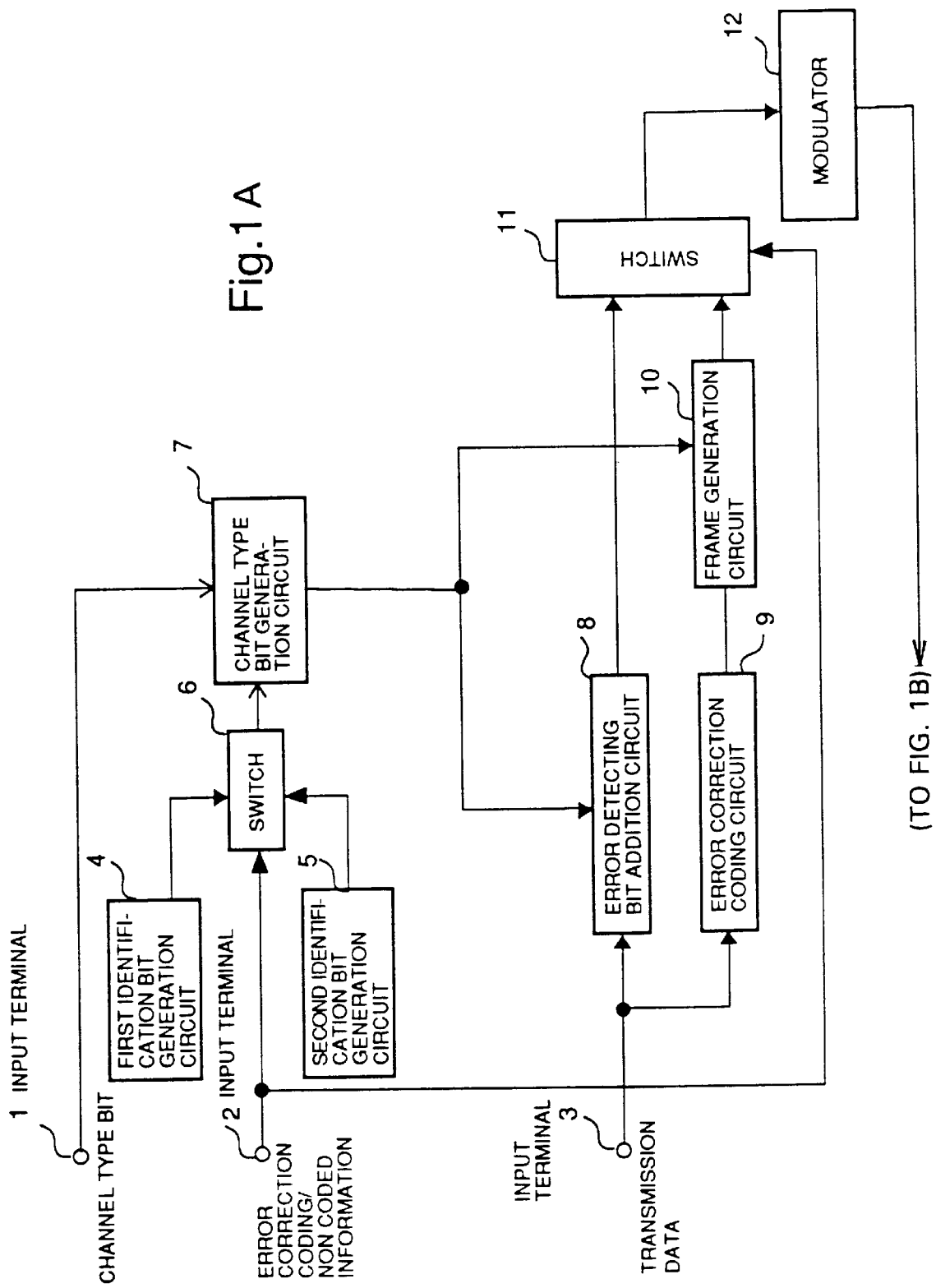

| TYPE OF INFORMATION \ CHANNEL ERROR | NO | YES — ERROR OTHER THAN CHANNEL TYPE BIT | YES — ERROR OF CHANNELTYPE BIT(1) | YES — ERROR OF CHANNELTYPE BIT(2) |
|---|---|---|---|---|
| NON ERROR CORRECTION CODED INFORMATION | ERROR DETECTION CIRCUIT 14 DOES NOT DETECT AN ERROR → CHANNEL TYPE DETECTION CIRCUIT 17 DETERMINES FRAME PROCESSING PROCESS → TRANSFER TO NEXT STAGE PROCESS | ERROR DETECTION CIRCUIT 14 DETECTS AN ERROR → IDENTIFICATION BIT DETECTION CIRCUIT 17 DETERMINES THAT IT IS NON ERROR CORRECTION CODED INFORMATION → ABANDON THE FRAME | ERROR DETECTION CIRCUIT 14 DETECTS AN ERROR → IDENTIFICATION BIT DETECTION CIRCUIT 17 DETERMINES THAT IT IS NON ERROR CORRECTION CODED INFORMATION → ABANDON THE FRAME | ERROR DETECTION CIRCUIT 14 DETECTS AN ERROR → IDENTIFICATION BIT DETECTION CIRCUIT 17 DETERMINES THAT IT IS ERROR CORRECTION CODED INFORMATION → CHANNEL TYPE DETECTION CIRCUIT 18 DETERMINES FRAME PROCESSING PROCESS → TRANSFER TO NEXT PROCESS AFTER ERROR CORRECTION DECODING, BUT AN ERROR OCCURS |
| ERROR CORRECTION CODED INFORMATION | ERROR DETECTION CIRCUIT 14 DETECTS AN ERROR → IDENTIFICATION BIT DETECTION CIRCUIT 17 DETECTS THAT IT IS ERROR CORRECTION CODED INFORMATION → CHANNEL TYPE DETECTION CIRCUIT 18 DETERMINES FRAME PROCESSING PROCESS → TRANSFER TO NEXT PROCESS AFTER ERROR CORRECTION DECODING | ERROR DETECTION CIRCUIT 14 DETECTS AN ERROR → IDENTIFICATION BIT DETECTION CIRCUIT 17 DETERMINES THAT IT IS ERROR CORRECTION CODED INFORMATION → CHANNEL TYPE DETECTION CIRCUIT 18 DETERMINES FRAME PROCESSING PROCESS → TRANSFER TO NEXT PROCESS AFTER ERROR CORRECTION DECODING | ERROR DETECTION CIRCUIT 14 DETECTS AN ERROR → IDENTIFICATION BIT DETECTION CIRCUIT 17 DETERMINES THAT IT IS ERROR CORRECTION CODED INFORMATION → CHANNEL TYPE DETECTION CIRCUIT 18 DETERMINES FRAME PROCESSING PROCESS → ABANDON THE FRAME | ERROR DETECTION CIRCUIT 14 DETECTS AN ERROR → IDENTIFICATION BIT DETECTION CIRCUIT 17 DETERMINES THAT IT IS NON ERROR CORRECTION CODED INFORMATION → ABANDON THE FRAME |

FIG.4

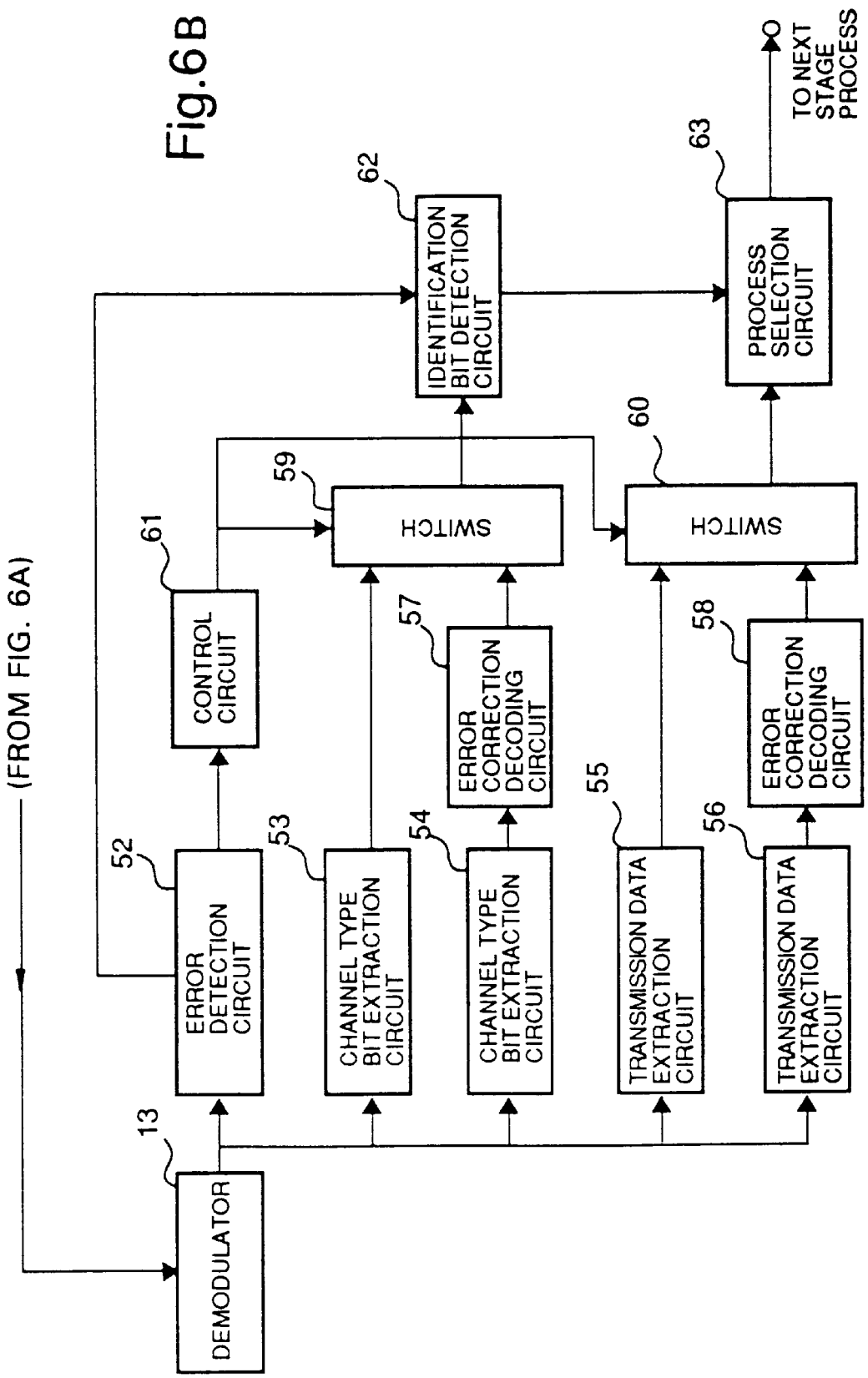

| CHANNEL ERROR / TYPE OF INFORMATION | NO | YES | |
|---|---|---|---|
| | | ERROR OTHER THAN CHANNEL TYPE BIT | ERROR OF CHANNEL TYPE BIT(1) | ERROR OF CHANNEL TYPE BIT(2) |
| NON ERROR CORRECTION CODED INFORMATION | ERROR DETECTION CIRCUIT 52 DOES NOT DETECT AN ERROR → IDENTIFICATION BIT DETECTION CIRCUIT 62 DETERMINES FRAME PROCESSING → TRANSFER TO NEXT STAGE PROCESS | ERROR DETECTION CIRCUIT 52 DETECTS AN ERROR → ERROR CORRECTION CODING CHANNEL TYPE BIT → IDENTIFICATION BIT DETECTION CIRCUIT 62 DETERMINES THAT IT IS NON ERROR CORRECTION CODED INFORMATION → ABANDON THE FRAME | ERROR DETECTION CIRCUIT 52 DETECTS AN ERROR → ERROR CORRECTION CODING CHANNEL TYPE BIT → IDENTIFICATION BIT DETECTION CIRCUIT 62 DETERMINES THAT IT IS NON ERROR CORRECTION CODED INFORMATION → ABANDON THE FRAME | ERROR DETECTION CIRCUIT 52 DETECTS AN ERROR → ERROR CORRECTION CODING CHANNEL TYPE BIT → IDENTIFICATION BIT DETECTION CIRCUIT 62 DETERMINES THAT IT IS ERROR CORRECTION CODED INFORMATION → CHANNEL TYPE DETECTION CIRCUIT DETERMINES FRAME PROCESSING PROCESS → TRANSFER TO NEXT PROCESS AFTER ERROR CORRECTION DECODING, BUT AN ERROR OCCURS |
| ERROR CORRECTION CODED INFORMATION | ERROR DETECTION CIRCUIT 52 DETECTS AN ERROR → ERROR CORRECTION CODING CHANNEL TYPE BIT → IDENTIFICATION BIT DETECTION CIRCUIT 62 DETERMINES THAT IT IS ERROR CORRECTION CODED INFORMATION → IDENTIFICATION BIT CIRCUIT 62 DETERMINES FRAME PROCESSING PROCESS → TRANSFER TO NEXT PROCESS AFTER ERROR CORRECTION DECODING | ERROR DETECTION CIRCUIT 52 DETECTS AN ERROR → ERROR CORRECTION CODING CHANNEL TYPE BIT → IDENTIFICATION BIT DETECTION CIRCUIT 62 DETERMINES THAT IT IS ERROR CORRECTION CODED INFORMATION → PROCESS SELECTION CIRCUIT 63 DETERMINES FRAME PROCESSING PROCESS → TRANSFER TO NEXT PROCESS AFTER ERROR CORRECTION DECODING | ERROR DETECTION CIRCUIT 52 DETECTS AN ERROR → ERROR CORRECTION CODING CHANNEL TYPE BIT → IDENTIFICATION BIT DETECTION CIRCUIT 62 DETERMINES THAT IT IS ERROR CORRECTION CODED INFORMATION → PROCESS SELECTION CIRCUIT 63 DETERMINES FRAME PROCESSING PROCESS → TRANSFER TO NEXT PROCESS AFTER ERROR CORRECTION DECODING | ERROR DETECTION CIRCUIT 52 DETECTS AN ERROR → ERROR CORRECTION CODING CHANNEL TYPE BIT → IDENTIFICATION BIT DETECTION CIRCUIT 62 DETERMINES THAT IT IS NON ERROR CORRECTION CODED INFORMATION → ABANDON THE FRAME |

FIG.8

COMMUNICATION METHOD AND COMMUNICATION SYSTEM USING THE SAME

BACKGROUND OF THE INVENTION

This invention relates to a communication technology for transmitting error correction coded information effectively through a communication system which has not been designed to process the error correction coded information with minimized modification thereof.

With a conventional communication system which has not been designed to transmit the error correction coded information, a transmission side serves to add error-detecting information to each transmission frame. An addressed reception side receives the transmission frame as FIG. 9 shows (step 605), and inspects whether or not the received frame has an error (step 600) by using the error-detecting information added to the transmission frame. If it is determined that an error exists in the received frame (step 601), the frame is abandoned (step 602).

While if it is determined that no error exists in the received frame, inspection is executed for each channel type (step 603), and the process further proceeds to the next step (step 604), where it is determined whether or not communication has been completed (step 606). If the communication has been completed, the line is disconnected. If it is determined that the communication has not been completed, the process returns to the step 605.

In order to make up for the abandoned frame, re-transmission of the same frame is required through, for example, an ARQ system (See Vijay K. Bhargava, David Ahccoun, Robert Matyas, and Peter P. Nuspl, "Digital Communications by Satellite", Willey & Sons, Inc., 1983).

With the above system, deterioration of the channel quality may increase the error rate in the frame, and demand frequent frame re-transmission, thus degrading transmission efficiency. In order to prevent the above described degradation of the transmission efficiency, an art for error correction coding has been disclosed. This art is used to correct the error correctable within a capacity of the error correction code, and to keep the transmission efficiency from degrading.

However such system is required to be designed on an assumption that the information which has been previously error correction coded is transmitted so as to improve transmission efficiency through the error correction coding technology. The system which has not been designed to transmit the error correction coded information as described above is so constructed to abandon the received frame if an error is found from the error-detecting information added to the transmission frame. Accordingly although the error correction coded information is transmitted, its function cannot work well, thus failing to overcome degradation of the transmission efficiency.

SUMMARY OF THE INVENTION

It is an object of the present invention to provide a communication technology for enabling a system which has not been intended to transmit error correction coded information to process different frame types of both non error correction coded information and error correction coded information with minimized modification thereof.

The object of the present invention is achieved by a communication method transmitting both first information that is error correction coded and second information that is not error correction coded, the communication method comprising steps of: generating a frame of a first frame type from the first information and transmitting the frame; generating a frame of a second frame type from the second information and transmitting the frame; receiving a frame and detecting whether the received frame has an error; outputting the received frame to a next process stage if the received frame has not an error; detecting a frame type of the received frame if the received frame has an error; and outputting the received frame to the process stage if the detected frame type is the first frame type and abandoning the received frame if the detected frame type is the second frame type.

BRIEF DESCRIPTION OF THE DRAWINGS

This and other objects, features and advantages of the present invention will become more apparent upon a reading of the following detailed description and drawings, in which:

FIGS. 1A and 1B are block diagrams of the first embodiment of the present invention;

FIG. 4 is a table showing a relation between an error on a channel and frame processing of the first embodiment of the present invention;

FIGS. 6A and 6B are block diagrams of the second embodiment of the present invention;

FIG. 8 is a table showing a relation between an error on a channel and frame processing of the second embodiment of the present invention.

DESCRIPTION OF THE PREFERRED EMBODIMENTS

A first embodiment is hereinafter described.

Figure 1B:
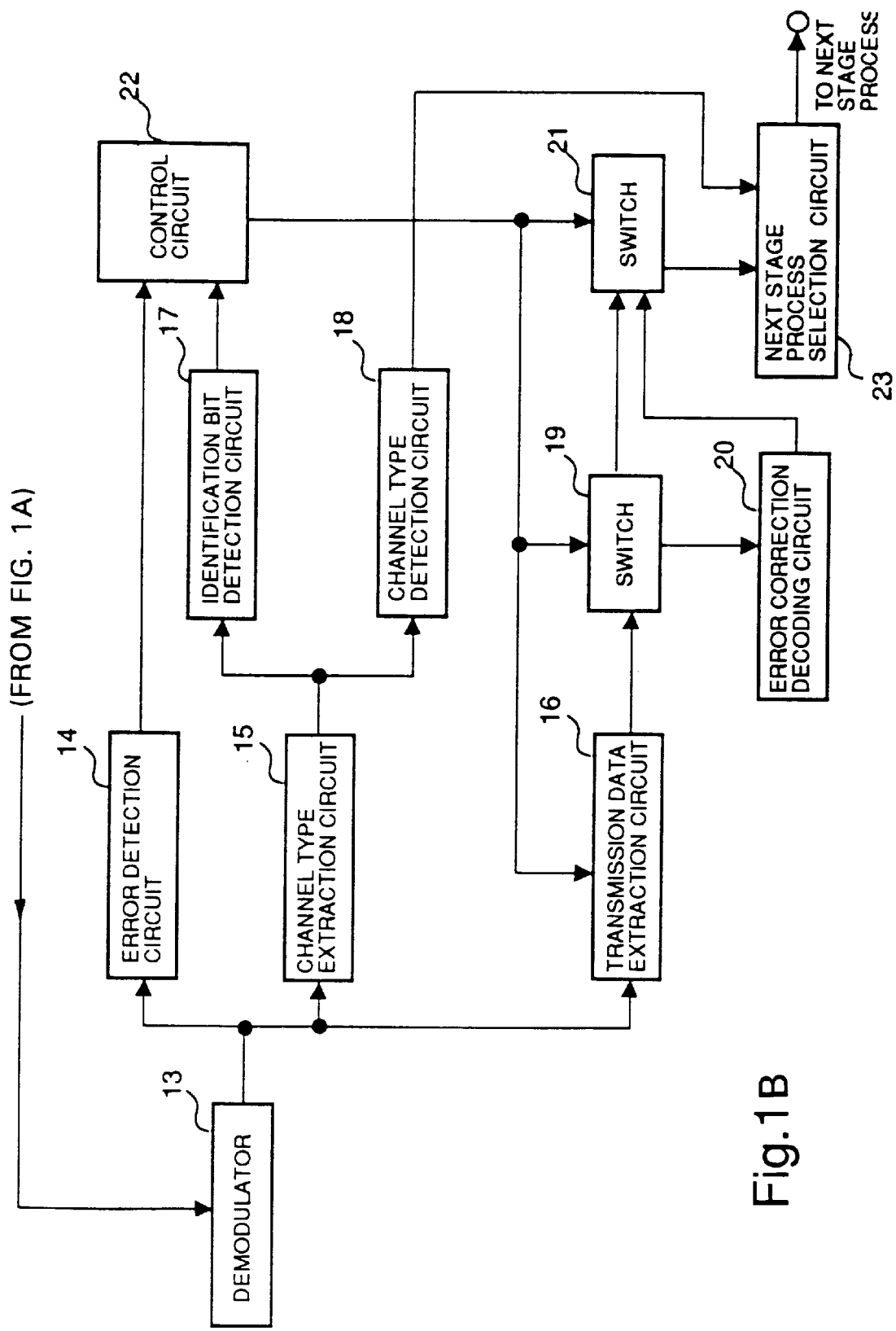

FIGS. 1A and 1B are block diagrams showing the first embodiment. FIG. 1A is a transmission side, and FIG. 1B is a reception side.

The transmission side distinguishes the error correction code information from non error correction coded information, and generates each frame therefor.

A frame for the error correction coded information is referred to as a first frame type, and the other frame for non error correction coded information is referred to as a second frame type.

Each frame construction is described.

Figure 2:
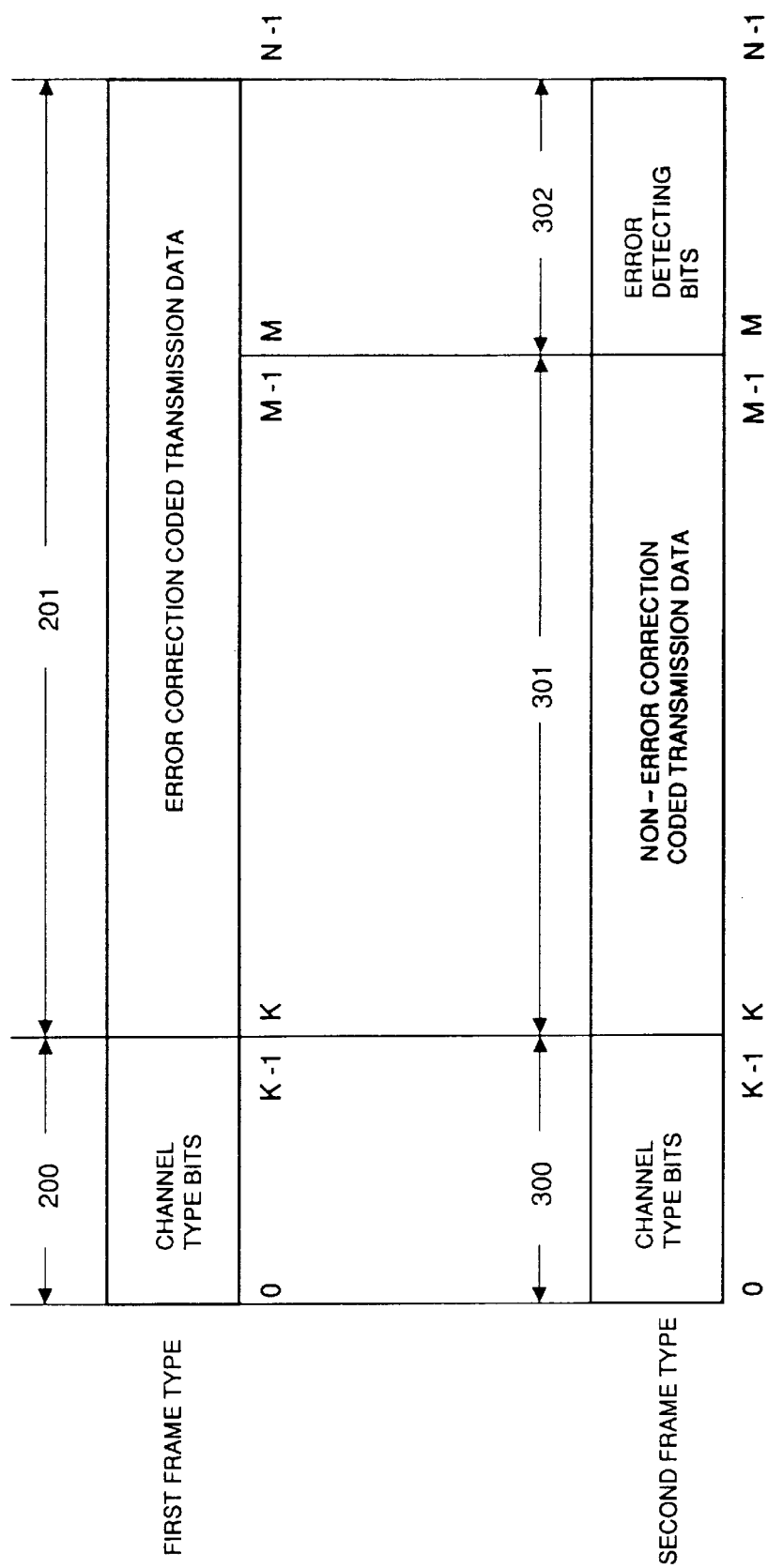
FIG. 2 is a figure showing a construction of a frame of of the first embodiment of the present invention.

FIG. 2 shows the construction of the first and the second frame types.

The frame of the first frame type includes N bits. The part of from first bit to the (K−1)-th bit is a channel type bits 200, where identification bits representing error correction coded information are arranged.

Other than the identification bit, the channel type bits 200 further includes information representing its type contained in the frame, such as an audio signal, an image signal, and the like, or information on channel identification such as control channel information, user data information, and the like.

A bit string of error correction coded transmission data 201 is arranged as those bits from the k-th bit to the (N−1)-th bit, i.e., (N-K) bits.

The second frame includes N bits. Thus, the frame bit number (N bits) of the second frame is the same as that of the first frame (N bits). With respect to the second frame, its; first to (K−1)-th bits are a channel type bits 300 where identification bits representing non error correction coded information are arranged.

Similar to the channel type bits 200, other than the identification bit, the channel type bits 300 further includes information representing its type contained in the frame such as an audio signal, an image signal, and the like, or information on channel identification such as control channel information, user data information, and the like.

A bit string of non-error correction coded transmission data 301 is arranged as those bits from the k-th bit to the (M−1)-th bit, i.e., (M-K) bits.

Furthermore, in the second frame type, the error-detecting bits 302 which determines whether or not the bit string has an error from the first bit to the (M−1)-th bit of the frame is arranged at those bits from the M-th bit to the (N−1)-th bit, i.e., (N-M) bits. The error-detecting bits 302 are allowed to use a cyclic redundancy inspection code (CRC) expressed by the following generating function as follows:

$$X^{15}+X^{12}+X^5+1$$

In the first frame type, a part of a bit string of the error correction coded transmission data 201 is arranged at (N-M−1) bits from the M-th bit to the (N−1)-th bit.

Referring to FIG. 1A, generation of the aforementioned frame at the transmission side is described.

An input terminal 1 receives a channel type bit (except identification bit). An input terminal 2 receives an information signal representing whether or not error correction coding is required. An input terminal 3 receives transmission data.

A first identification bit generation circuit 4 generates an error correction coded identification bit representing the error correction coded frame (the first frame type).

A second identification bit generation circuit 5 generates a non error correction coded identification bit representing the non error correction coded frame (the second frame type).

A switch 6 receives an error correction coded identification bit and a non error correction coded identification bit. If an information signal from the input terminal 2 indicates error correction coding status, it outputs the error correction coded identification bit, and if the information signal from the input terminal 2 indicates non error correction coding status, it outputs the non error correction coded identification bit.

A channel type bit generation circuit 7 serves to generate a channel type bit by adding the identification bit output from the switch 6 to the existing channel type bit.

An error-detecting bit addition circuit 8 serves to add the error-detecting bits to both the non error correction coded transmission data and the channel type bit. It further generates a frame of the second frame type from the non error correction coded transmission data, the channel type bit and the error-detecting bits.

An error correction coding circuit 9 performs error correction coding for the transmission data.

A frame generation circuit 10 generates a frame of the first frame type from the error correction coded transmission data and the channel type bit and outputs the generated frame.

A switch 11 receives a frame (first frame type) generated in the frame generation circuit 10 and a frame (second frame type) generated in the error-detecting bit addition circuit 8. If it indicates that the information signal from the input terminal 2 has been error correction coded, the frame generated in the frame generation circuit 10 is output. If it indicates that the information signal from the input terminal 2 has been non error correction coded, the frame generated in the error-detecting bit addition circuit 8 is output.

A modulator 12 modulates the input frame and transmits it to the reception side shown in FIG. 1B.

Next the reception side shown in FIG. 1B is explained.

A demodulator 13 demodulates a frame. The demodulated frame is output to an error detection circuit 14, a channel type extraction circuit 15 and a transmission data extraction circuit 16.

The error detection circuit 14 uses a bit string where (N-M) bits arranged from the M-th bit to the (N−1)-th bit in the received frame as error-detecting bits, and detects whether or not the received frame has an error therein. If the received frame is of the second frame type and no error occurs in the received frame, the error detection circuit 14 can determine that no error exists in the received frame, since error-detecting bits are arranged in the transmission side at bits from the M-th bit to the (N−1)-th bit. If the received frame is of the first frame type, the error detection circuit 14 determines that the error exists in the received frame irrespective of existence of errors therein, since the transmission data is arranged instead of error-detecting bits in the bits from the M-th bit to the (N−1)-th bit.

The channel type extraction circuit 15 extracts only channel type bit from the received frame.

The transmission data extraction circuit 16 extracts only transmission data from the received frame based on the control of a control circuit 22 (described later).

An identification bit detection circuit 17 detects a frame type based on the identification bit within the extracted channel type bits.

A channel type detection circuit 18 detects the channel information, such as an audio signal, an image signal and the like contained in the frame, from the extracted channel type bit. Furthermore, the channel type detection circuit 18 determines frame processing process based on the detected channel type bit.

Under the control of the control circuit 22, a switch 19 selectively outputs the input transmission data to either the error correction decoding circuit 20 or a switch 21.

The error correction decoding circuit 20 correction decodes the input transmission data and outputs the decoded result to a switch 21.

Under the control of the control circuit 22, the switch 21 selectively outputs either data from the switch 19 (transmission data of the second frame type) or data from the error correction decoding circuit 20 (transmission data of the first frame type).

Receiving the detected results of the error detection circuits 14 and the identification bit detection circuit 17, the control circuit 22 controls in the following manners.

(1) If the error detection circuit 14 has detected an error and the identification bit detection circuit 17 has detected the identification bit representing the first frame type:
(a) Makes the transmission data extraction circuit 16 extract a bit string of from the K-th bit to the (N−1)-th bit in the received frame.
(b) Makes the switch 19 output the input transmission data to the error correction decoding circuit 20.
(c) Makes the switch 21 select and output the transmitted data from the error correction decoding circuit 20.

(2) If the error detection circuit 14 has detected an error and the identification bit detection circuit 17 has detected an identification bit representing the second frame type:
(a) Stops extracting operation of the transmission data extraction circuit 16.
(b) Stops operation of the switch 19.
(c) Stops operation of the switch 21.
(3) If the error detection circuit 14 has detected no error and the identification bit detection circuit 17 has detected an identification bit representing the second frame type:
(a) Makes the transmission data extraction circuit 16 extract the bit string of from the K-bit to the (M−1)-th bit in the received frame.
(b) Makes the switch 19 output the input transmission data to the switch 21.
(c) Makes the switch 21 select and output the transmission data from the switch 19.

In case the received frame is of the first frame type, the error detection circuit 14 is designed to detect the error as described above. So it is not assumed that the error detection circuit 14 detects no error, and the identification bit detection circuit 17 detects the identification bit representing the first frame type.

A next stage process selection circuit 23 outputs both the transmission data output from the switch 21 and the channel type bits to the next stage process collectively. In the case of the above condition (2), since the switch 21 outputs no transmission data, no channel type bits are output to the next stage process, thus the received frame is abandoned. Furthermore, the received frame is abandoned not transferred to the next stage process if the channel type detection circuit 18 detects an error in the channel type bit.

As aforementioned, the process for a received frame is completed.

Figure 3:
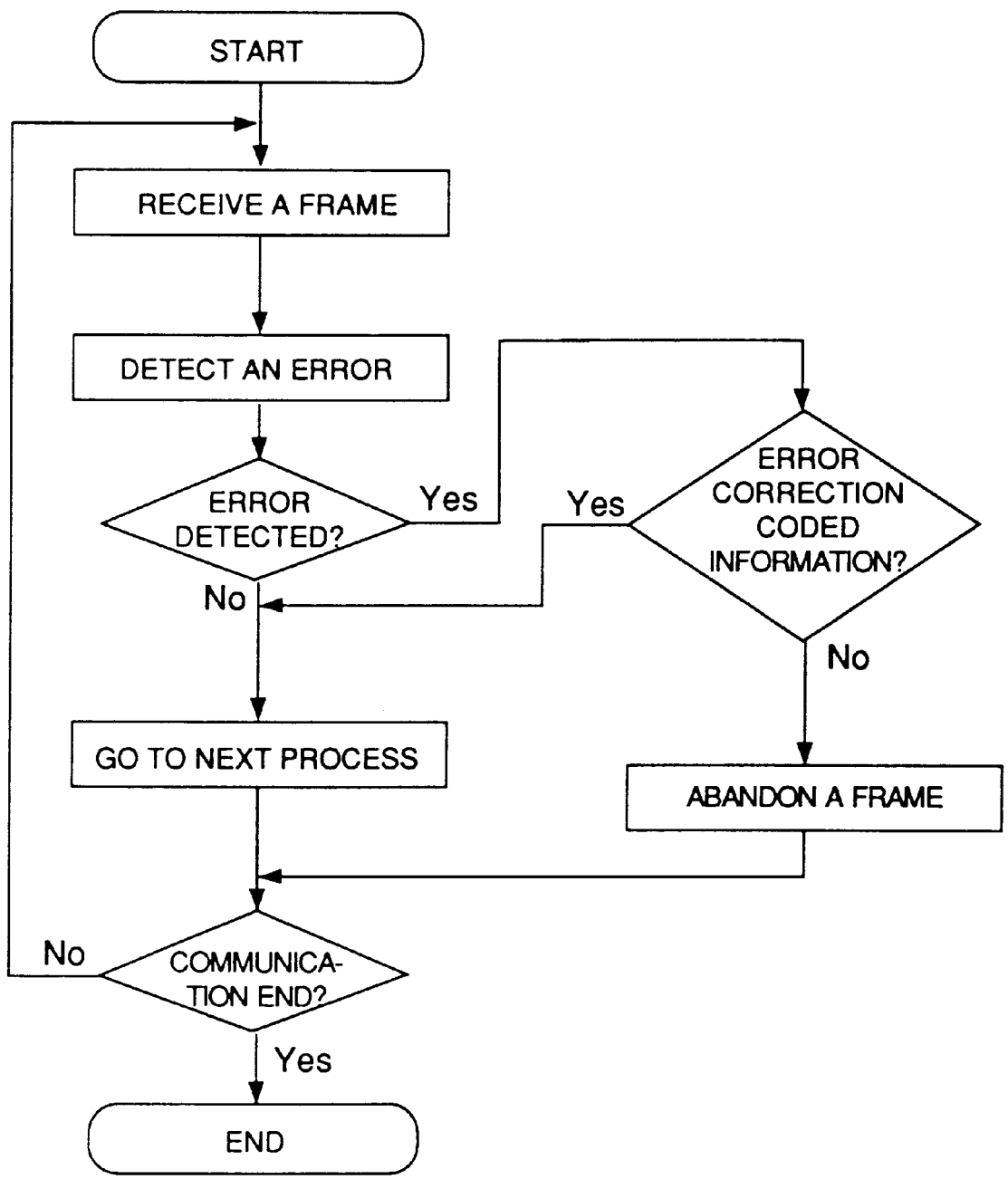
FIG. 3 is a flow chart of the first embodiment of the present invention.

FIG. 3 shows a flowchart of the processing from receiving a frame to the end of the communication.

FIG. 4 is a table showing a relation between errors on transfer channel and processing of the received frame.

Referring to FIG. 4, a channel type bits error (1) indicates the case where an identification bit has not been inverted, which represents the information as to either error correction coding or non error correction coding in spite of an error in the channel type bits.

A channel type bits error (2) indicates the case where the identification bit has been inverted.

In FIG. 4, the frame receiving non error correction coded information (second frame type) has an error only when the channel type bit error (2) occurs.

As for the frame receiving the error correction coded information (first frame type), the process proceeds to the next stage unless an error occurs in the channel type bits.

As described above, the present invention enables the communication system combining error correction coded and non error correction coded information to execute effective transmission.

A second embodiment is hereinafter described.

In the second embodiment, a redundancy bit field to the channel type bit is added to the first frame type of the first embodiment.

Accordingly the explanation is made only to the part which is different from the first embodiment.

Figure 5:
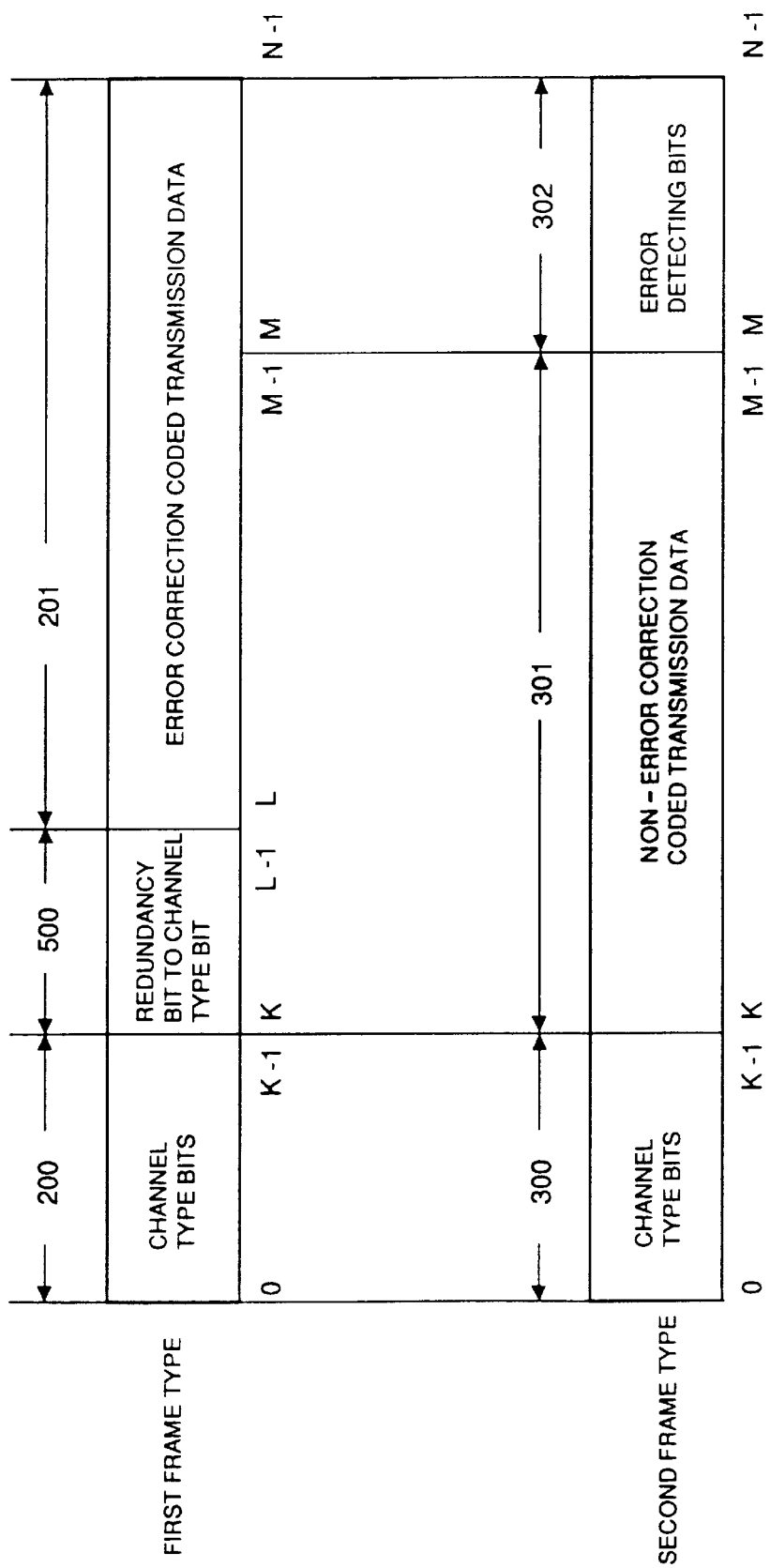
FIG. 5 is a figure showing a construction of a frame of of the second embodiment of the present invention.

FIG. 5 shows a frame type for the error correction coded information in the second embodiment.

Here, the first frame type of the first embodiment is provided with a redundancy bit string 500 to the channel type bit arranged from the L-th bit to the (L−1)-th bit. Other frame type is the same as that of the first embodiment.

An error correction decoding is executed assuming that a bit string of K bits arranged from the first bit to the (K−1)-th bit in the received frame as an information bits, and a bit string of (L−K) bits arranged from the K-th bit to the (L−1)-th bit in the received frame as redundancy bits. In the error correction decoding, in case of the error correction coded information, the channel type bits have been error correction coded at the transmission side A, which comprises the channel type bit arranged from the first bit to the (K−1)-th bit in the frame, and the redundancy bit arranged from the K-th bit to the (L−1)-th bit. So the channel type bit can be decoded correctly if it has an error of within the capability of the error correction.

The frame type provided with the redundancy bit described above is referred to as a first frame type, hereinafter.

Figure 6A:
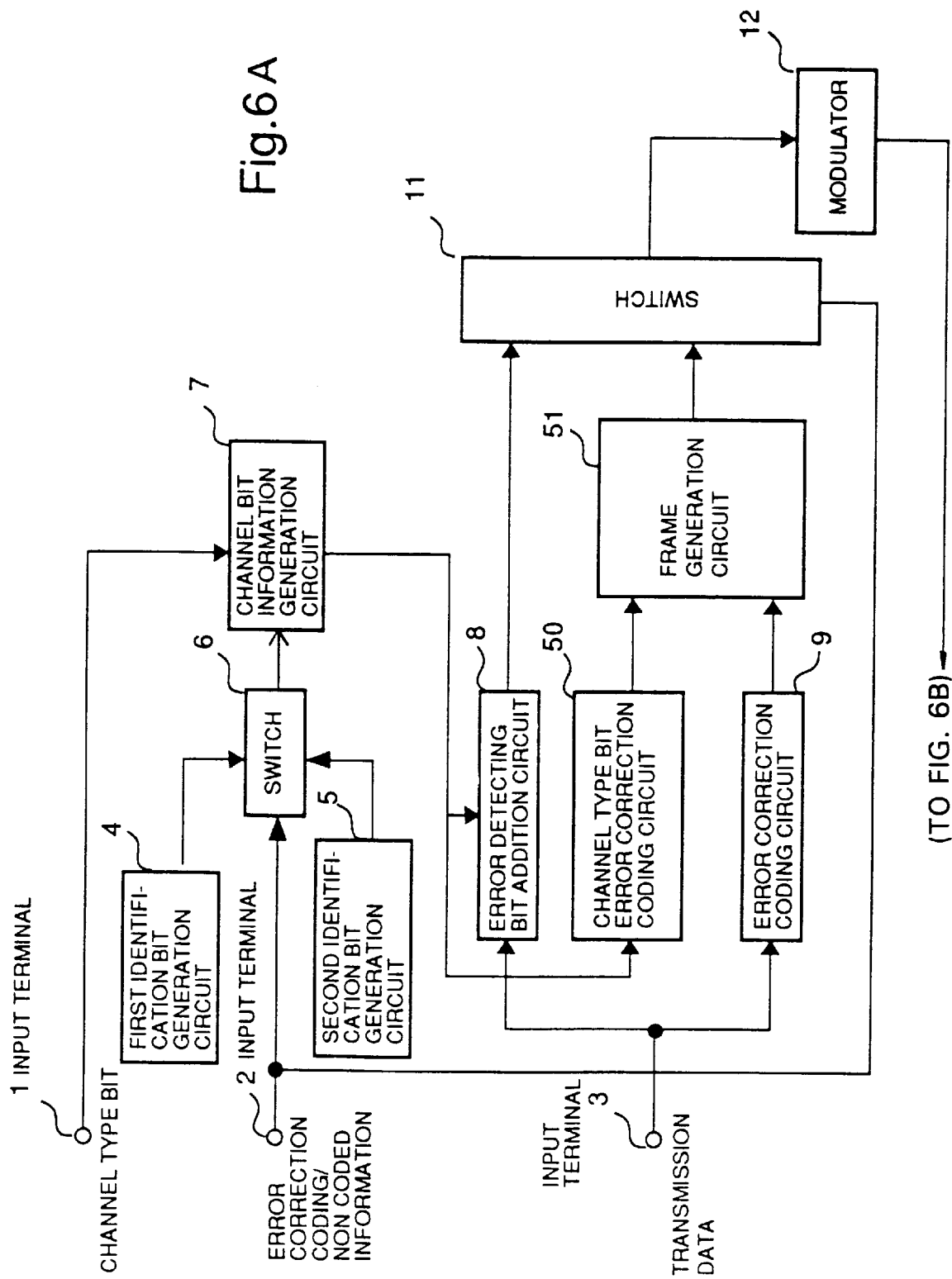

A more detailed function is described referring to FIGS. 6A and 6B.

Referring to FIG. 6A an input terminal 1 receives a channel type information (except the identification bit). An input terminal 2 receives an information signal representing whether or not error correction coding is required. An input terminal 3 receives transmission data.

A first identification bit generation circuit 4 generates an error correction coded identification bit representing the error correction coded frame (the first frame type).

An second identification bit generation circuit 5 generates a non error correction coded identification bit representing non error correction coded frame (the second frame type).

A switch 6 receives the error correction coded identification bit and the non error correction coded identification bit. If an information signal from the input terminal 2 indicates error correction coding status, it outputs the error correction coded identification bit, and if it indicates non error correction coding status, it outputs the non error correction coded identification bit.

A channel type bit generation circuit 7 serves to generate a channel type bit by adding the identification bit output form the switch 6 to the an existing channel type bit.

An error-detecting bit addition circuit 8 serves to add the error-detecting bits to both the non error correction coded transmission data and the channel type bit. It further generates a frame adaptable to the second frame type from the non error correction coded transmission data and the error-detecting bits.

An error correction coding circuit 9 performs error correction coding for the transmission data.

A channel type bit error correction coding circuit 50 generates a redundancy bit by error correction coding the channel type bit.

A frame generation circuit 51 generates a frame of the above first frame type for the error correction coded transmission data, the error correction coded channel type bit and the redundancy bit and outputs the generated frame.

A switch 11 receives a frame (first frame type) generated in the frame generation circuit 10 and a frame (second frame type) generated in the error-detecting bit addition circuit 8. If it indicates that the information signal from the input terminal 2 has been error correction coded, the frame generated in the frame generation circuit 51 is output. While if it has been non error correction coded, the frame generated in the error-detecting bit addition circuit 8 is output.

A modulator 12 modulates the input frame and transmits it to the reception side shown in FIG. 6B.

Next the reception side shown in FIG. 6B is explained.

A demodulator 13 demodulates a frame. The demodulated frame is output to an error detection circuit 52, a first channel type bit extraction circuit 53, a second channel type bit extraction circuit 54, a first transmission data extraction circuit 55, and a second transmission data extraction circuit 56, respectively.

The error detection circuit 52 uses a bit string where (N-M) bits arranged from the M-th bit to the (N-1)-th bit in the received frame as error-detecting bits, and determines whether or not the received frame has an error therein. If the received frame is of the second frame type and no error occurs in the received frame, the error detection circuit 52 can determine that no error exists in the received frame, since error-detecting bits are arranged in the transmission side for bits from the M-th bit to the (N-1)-th bit. While if the received frame is of the first frame type, the error detection circuit 52 determines that the error exists in the received frame irrespective of existence of errors therein, since the transmission data is arranged instead of error-detecting bits in the bits from the M-th bit to the (N-1)-th bit.

The first and the second channel type bit extraction circuits 53 and 54 extract only channel type bits from the received frame. The first channel type bit extraction circuit 53 outputs the extracted channel type bits to a switch 59. The second channel type bit extraction circuit 54 outputs the extracted channel type bits to the error correction decoding circuit 57.

The error correction decoding circuit 57 performs correction decoding for the channel type bit from the redundancy bit and outputs the decoding results to the first switch 59.

The first and the second transmission data extraction circuits 55 and 56 extract only transmission data from the received frame. The first transmission data extraction circuit 54 outputs the extracted transmission data to a switch 60. The second transmission data extraction circuit 56 outputs the extracted transmission data to the error correction decoding circuit 58.

The error correction decoding circuit 58 performs correction decoding for the transmission data and outputs the decoding results to the switch 60.

Under the control of a control circuit 61, the switch 59 selectively outputs either the output of the first channel type extraction circuit 53 (non error corrected channel type bit) or the output of the error correction decoding circuit 57 (error corrected channel type bit).

Under the control of the control circuit 61, the switch 60 selectively outputs either the output of the first transmission data extraction circuit 55 (non error corrected transmission data), or the output of the error correction decoding circuit 58 (error corrected transmission data).

Receiving the detection results of the error detection circuit 52, the control circuit 61 controls in the following manners.

(1) If the error detection circuit 52 has detected an error:
(a) Makes the switch 59 select the output of the error correction decoding circuit 57 (error corrected channel type bit).
(b) Makes the switch 60 select the output of the error correction decoding circuit 58 (error corrected transmission data).

(2) If the error detection circuit 52 has detected no error:
(a) Makes the switch 59 select the output of the first channel type extraction circuit 53 (non error corrected channel type bit).
(b) Makes the switch 60 select the output of the error correction decoding circuit 58 (error corrected transmission data).

An identification bit detection circuit 62 detects the frame type based on the input identification bit in the channel type bit, and outputs the channel type bit other than the identification bits to a process selection circuit 63 (to be described later). Based on the detection results of the error detection circuit 52 and the detected frame type, the identification bit detection circuit 62 further controls the process selection circuit 63 in the following manners.

(1) If the error detection circuit 52 has detected both an error and the identification bit detection circuit 62 the identification bit representing the first frame type, the input transmission data and channel information are output to the process of the succeeding stage.

(2) If the error detection circuit 52 has detected both an error and the identification bit detection circuit 62 has detected the identification bit representing the second frame type, the input transmission data and channel information are abandoned.

(3) If the error detection circuit 52 detects no error and the identification bit representing the second frame type, the input transmission data and channel information are output to the process of the succeeding stage.

In case the received frame is of the first frame type, the error detection circuit 52 is designed to detect the error as described above. So it is not assumed that the error detection circuit 52 detects no error, and the identification bit detection circuit 62 detects the identification bit representing the first frame type.

The process selection circuit 63 determines how to process the frame based on the channel type bit.

The process selection circuit 63 outputs or abandons the input channel information and transmission data to the process of succeeding stage under the control as described above.

As aforementioned, the process for a received frame is completed.

Figure 7:
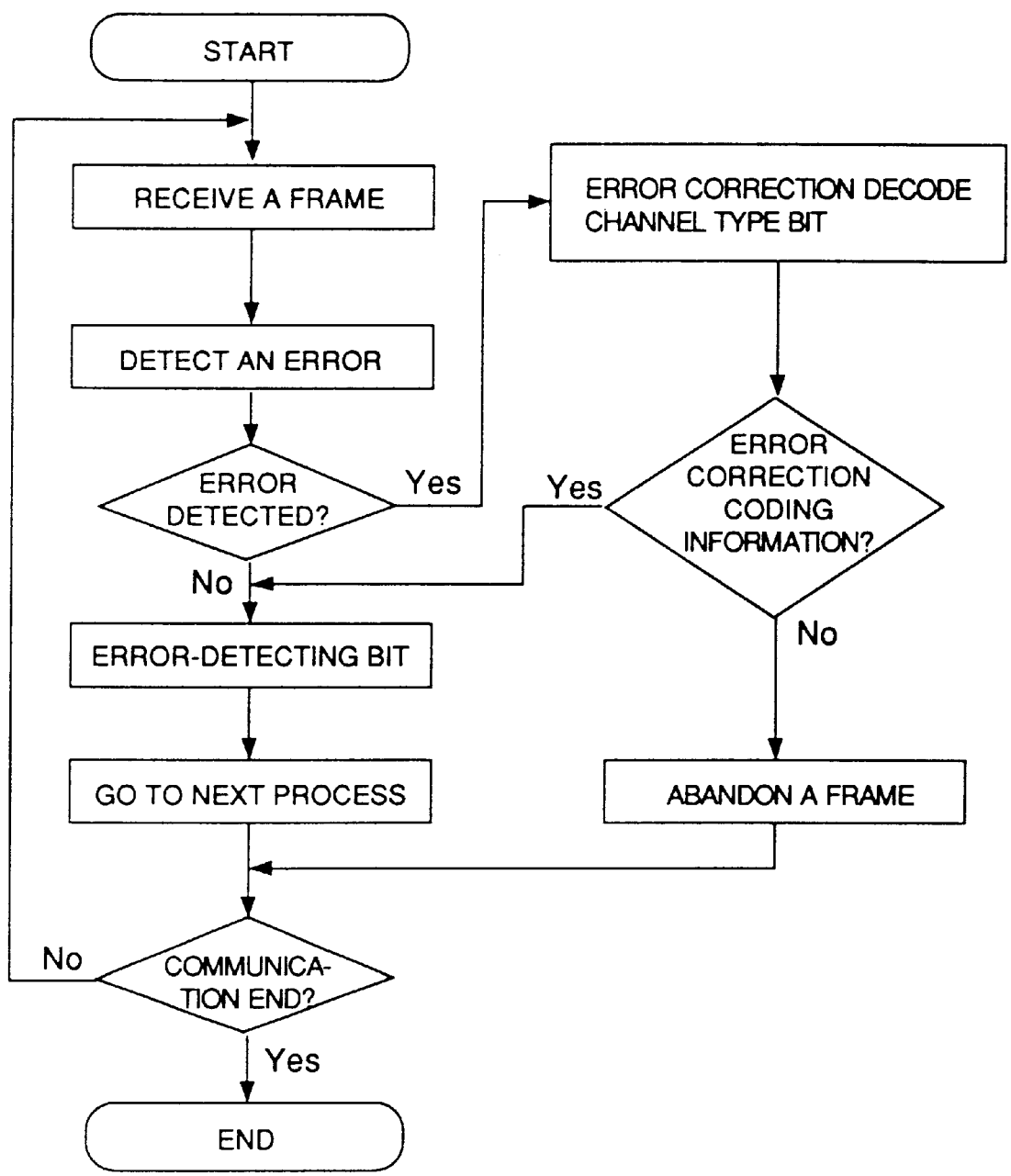
FIG. 7 is a flow chart of the second embodiment of the present invention.
Figure 9:
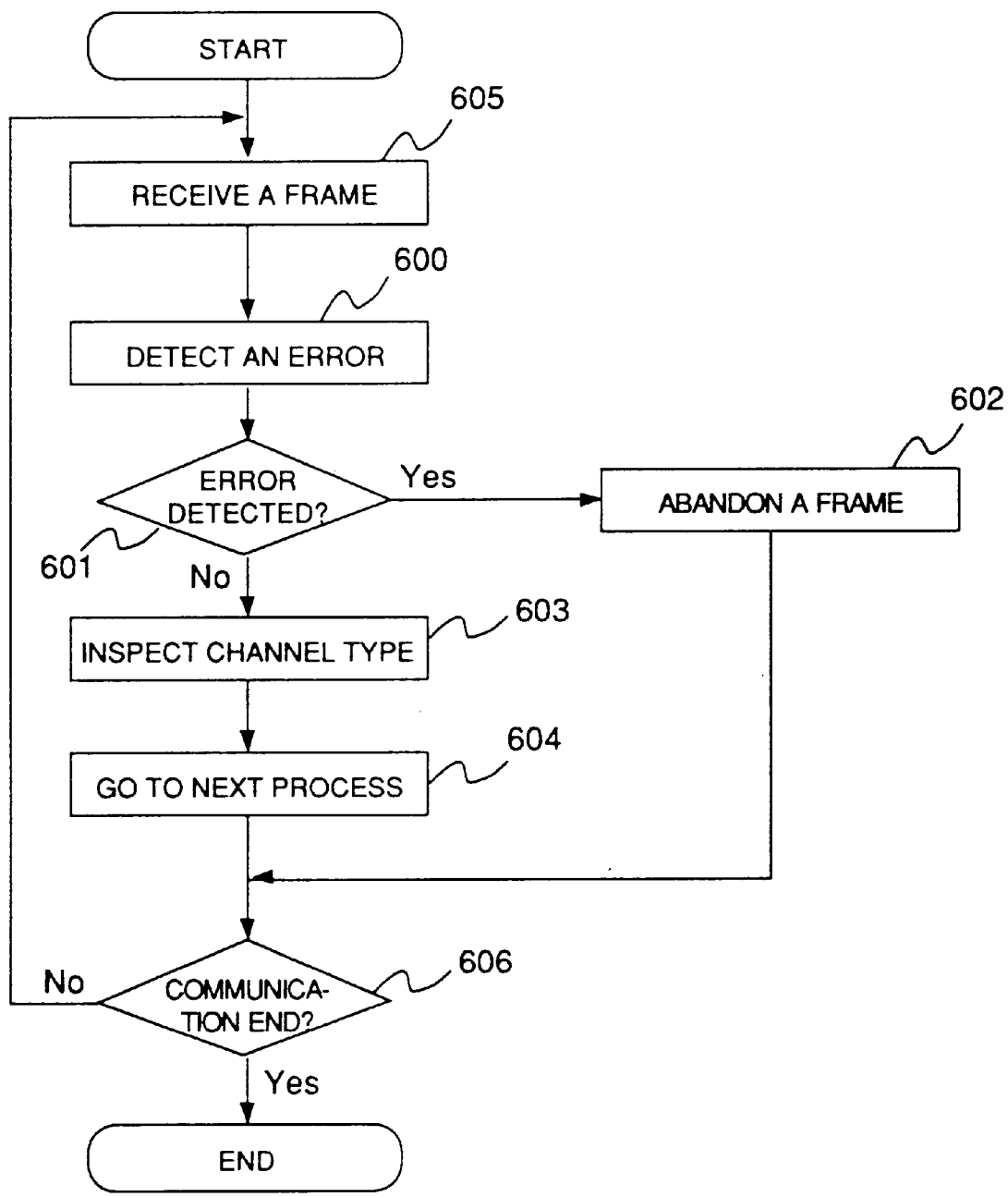
FIG. 9 is a flow chart of a prior art.

FIG. 7 shows a flowchart of the processing from receiving the frame to the end of the communication.

FIG. 8 is a table showing a relation between errors on a transfer channel and processing of the received frame.

Referring to FIG. 8, a channel type bit error (1) indicates the case where an identification bit has not been inverted, which represents the information as to either error correction coding or non error correction coding in spite of an error in the channel type bit.

A channel type bit error (2) indicates the case where the identification bit has been inverted.

In FIG. 8, the frame receiving non error correction coded information (second frame type) has an error only when the error other than that in the channel identification bit (2) occurs.

As for the frame receiving the error correction coded information (first frame type), the process proceeds to the next stage unless an error occurs in the channel bit.

As described above, the present invention enables the communication system which has not been designed to process error correction coded information to transmit the error correction coded information with minimized system modification. Realizing transmission of the error correction coded information improves communication without degradation of transmission efficiency.

What is claimed is:

1. A communication method for transmitting and receiving data in the form of either first information that is error correction coded or second information that is not error correction coded, said communication method comprising the steps of:

generating, from said data, a frame of a first frame type having said first information;

generating, from said data, a frame of a second frame type having said second information, said frame of said first frame type thereby coexisting with said frame of said second frame type;

transmitting one of said frame of said first frame type and said frame of said second frame type as a function of an input signal;

receiving a transmitted frame;

detecting whether said received frame has an error;

outputting said received frame to a next process stage when said received frame has no error;

detecting one of said first frame type and said second frame type from said received frame when said received frame has an error; and outputting said received frame to said next process stage when said detected frame type is of said first frame type and abandoning said received frame when said detected frame type is of said second frame type.

2. The communication method of claim 1, including said first frame type comprises a field for storing said first information and a field for storing identification information representing said first frame type; and said second frame type comprises a field for storing said second information, a field for storing identification information representing said second frame type and a field for storing an error-detecting bit, wherein a frame bit number of said first frame type is the same as the frame bit number of said second frame type.

3. The communication method of claim 2, wherein said step of detecting an error comprises a step of detecting whether said received frame has an error by checking bit contents of a field storing said error-detecting bit.

4. The communication method of claim 2, wherein said step of detecting a frame type comprises a step of detecting a frame type based on said identification information.

5. The communication method of claim 2, wherein said first frame type further comprises a field for storing redundancy information necessary to correct an error of said identification information.

6. The communication method of claim 5, wherein said step of detecting said frame type comprises a step of decoding said identification information based on said redundancy information and detecting a frame type based on said decoded identification information.

7. A communication method for transmitting and receiving data in the form of either first information that is error correction coded or second information that is not error correction coded, said communication method comprising the steps of:

converting said data to said first information;

converting said first information to a frame of a first frame type having a field for storing identification information representing said first frame type;

converting said data to said second information;

converting said second information to a frame of a second frame type, whose number of bits equals that of said frame of said first frame type, said frame having a field for storing said second information, a field for storing identification information representing said second frame type and a field for storing at least one error-detecting bit, said frame of said first frame type thereby coexisting with said frame of said second frame type;

transmitting one of said frame of said first frame type and said frame of said second frame type as a function of an input signal;

receiving a transmitted frame, detecting whether said received frame has an error based on bits located at said field for storing said at least one error-detecting bit of said received frame;

outputting said received frame to a next process stage when said received frame has no error;

detecting one of said first frame type and said second frame type from said received frame based on bit contents of said field for storing said identification information when said received frame has an error; and outputting said received frame to said next process stage when said detected frame type is said first frame type and abandoning said received frame when said detected frame type is said second frame type.

8. The communication method of claim 7, wherein said first frame type of said step of converting said first information to a frame further comprises a field for storing redundancy information necessary to correct an error of said identification information; and said step of detecting a frame type further comprises a step of decoding said identification information based on said redundancy information and detecting a frame type based on said decoded identification information.

9. A communication system comprising, in a transmission side:

means for generating a frame of a first frame type having first information that is error correction coded and for generating a frame of a second frame type having second information that is not error correction coded, said frame of said first frame type thereby coexisting with said frame of said second frame type, and means for transmitting one of said frame of said first frame type and said frame of said second frame type as a function of an input signal; and in a reception side:

receiving means for receiving a transmitted frame;

first detection means for detecting whether a received frame has an error;

second detection means for detecting one of said first frame type and said second frame type of said received frame and being operable when said first detection means detects an error;

first output means for outputting said received frame to a next process stage when said first detection means has not detected an error;

second output means for outputting said received frame to said next process stage when said first detection means has detected an error and when said second detection means has detected that said received frame is of said first frame type; and means for abandoning said received frame when said first detection means has detected an error and said second detection means has detected that said received frame is of said second frame type.

10. The communication system of claim 9, wherein said means for generating a frame further comprises:

means for generating a frame consisting of N bits and having preset fields for storing said first information and identification information representing said first frame type, if input information is said first information; and means for generating a frame consisting of N bits and having preset fields for storing said second information, identification information representing said second frame type and error-detecting information, if input information is said second information.

11. The communication system of claim 10, wherein said first detection means further comprises a means for detecting whether said received frame has an error by checking bit contents of a field storing said error-detecting information.

12. The communication system of claim 10, wherein said second detection means further comprises a means for detecting a frame type based on said identification information.

13. The communication system of claim 12, wherein said means for generating a frame further comprises means for adding a field for storing redundancy information necessary to correct an error of said identification information to a frame of said first frame type.

14. The communication system of claim 13, wherein said second detection means further comprising means for decoding said identification information based on said redundancy information and detecting a frame type based on said decoded identification information.

15. A communication system comprising, in a transmission side:
means for storing error correction coded first information in a preset field of a frame of a first frame type, storing identification information representing that said first information is error correction coded information in another preset field of said frame of said first frame type, said frame of said first frame type having a total of N bits;
means for storing non error correction coded second information in a preset field of a frame of a second frame type, storing identification information representing that said first information is error correction coded information in another preset field of said frame of said second frame type, storing error-detecting information in a further preset field of said frame of said second frame type, said frame of said second frame type having a total of N bits, said frame of said first frame type thereby coexisting with said frame of said second frame type;
means for transmitting one of said frame of said first frame type and said frame of said second frame type as a function of an input signal; and in a reception side:
means for receiving a transmitted frame;
first detection means for detecting whether said received frame has an error based on bits located in said error-detecting information field of received frame;
second detection means for detecting one of said first frame type and said second frame type from said received frame based on bit contents stored in said identification information field of said received frame, said second detection means being operable when said first detection means detects an error;
means for outputting said received frame to a next process stage when said first detection means has not detected an error;
means for outputting said received frame to said next process stage when said first detection means has detected an error and said second detection means has detected that said received frame is of said first frame type; and
means for abandoning said received frame when said first detection means has detected an error and said second detection means has detected that said received frame is of said second frame type.

16. The communication system of claim 15, wherein said means for generating said frame of said first frame type further comprises means for storing redundancy information necessary to correct said identification information in a preset field, and said second detection means further comprises means for decoding said identification information based on said redundancy information and detecting one of said first frame type and said second frame type based on said decoded identification information.

17. A communication system comprising, in a transmission side:
a generating device to generate a frame of a first frame type having first information that is error correction coded and for generating a frame of a second frame type having second information that is not error correction coded, said frame of said first frame type thereby coexisting with the frame of said second frame type, and
a transmitting device for transmitting one of said frame of said first frame type and said frame of said second frame type as a function of an input signal; and in a reception side:
receiving means for receiving a transmitted frame;
a first detection device to detect whether a received frame has an error;
a second detection device to detect one of said first frame type and said second frame type of said received frame and being operable when said first detection means detects an error;
a first output device to output said received frame to a next process stage when said first detection device has not detected an error;
a second output device to output said received frame to said next process stage when said first detection device has detected an error and when said second detection device has detected that said received frame is of said first frame type; and
an abandoning device to abandon said received frame when said first detection device has detected an error and said second detection device has detected that said received frame is of said second frame type.

18. A communication system comprising, in a transmission side:
a first storing device to store error correction coded first information in a preset field of a frame of a first frame type, to store identification information representing that said first information is error correction coded information in another preset field of said frame of said first frame type, said frame of said first frame type having a total of N bits;
a second storing device to store non-error correction coded second information in a preset field of a frame of a second frame type, to store identification information representing that said first information is error correction coded information in another preset field of said frame of said second frame type, to store error-detecting information in a further preset field of said frame of said second frame type, said frame of said second frame type having a total of N bits, said frame of said first frame type thereby coexisting with said frame of said second frame type;
a transmitting device for transmitting one of said frame of said first frame type and said frame of said second frame type as a function of an input signal; and in a reception side:
means for receiving a transmitted frame;

a first detection device to detect whether said received frame has an error based on bits located at said error-detecting information field of received frame;

a second detection device to detect one of said first frame type and said second frame type from said received frame based on bit contents stored in said identification information field of said received frame, said second detection device being operable when said first detection device detects an error;

a first output device to output said received frame to a next process stage when said first detection device has not detected an error;

a second output device to output said received frame to said next process stage when said first detection device has detected an error and said second detection device has detected that said received frame is of said first frame type; and an abandoning device to abandon said received frame when said first detection device has detected an error and said second detection device has detected that said received frame is of said second frame type.

* * * * *